United States Patent [19]

Simmons et al.

[11] Patent Number: 4,585,236
[45] Date of Patent: Apr. 29, 1986

[54] DOUBLE JOINTED COOLANT SEAL

[75] Inventors: Thomas E. Simmons, Westford; Charles L. Innis, Paxton; Ralph F. DiVirgilio, Jefferson, all of Mass.

[73] Assignee: Morgan Construction Company, Worcester, Mass.

[21] Appl. No.: 711,628

[22] Filed: Mar. 14, 1985

[51] Int. Cl.[4] .......................... F16J 15/32; F16J 15/34
[52] U.S. Cl. ...................................... 277/38; 277/152
[58] Field of Search ................... 277/38, 39, 152, 153, 277/189

[56] References Cited

U.S. PATENT DOCUMENTS

| | | | |
|---|---|---|---|
| 2,868,562 | 1/1959 | Heimbuch | 277/38 |
| 4,165,881 | 8/1979 | Salter | 277/152 |
| 4,234,196 | 11/1980 | Iida | 277/152 |
| 4,455,856 | 6/1984 | Salter | 277/152 |

Primary Examiner—Robert I. Smith
Attorney, Agent, or Firm—Thompson, Birch et al.

[57] ABSTRACT

A circular coolant seal has a base flange arranged in a base plane perpendicular to the seal axis. A flexible resilient sealing flange is integrally joined at one edge to the base flange and terminates at its opposite edge in a sealing lip located in a sealing plane parallel to and spaced axially from the base plane. The sealing lip has a first portion extending from the base flange angularly away from the base plane and inwardly towards the seal axis to an intermediate hinge portion, and a second portion extending from the hinge portion away from the seal axis and angularly towards the sealing plane. The configuration, flexibility and resilience of the sealing flange is such that axial displacement of the sealing lip in relation to the base flange is accompanied by both axial and radial displacement of the hinge portion.

8 Claims, 4 Drawing Figures

DOUBLE JOINTED COOLANT SEAL

BACKGROUND OF THE INVENTION

1. Field of the Invention

This invention relates to an improved coolant seal for a seal assembly of the type employed in oil film bearings in rolling mills.

2. Description of the Prior Art

A previously developed sealing arrangement for a rolling mill oil film bearing is shown in FIG. 1. In this arrangement, as described in U.S. Pat. No. 4,455,856 (Salter, et al), the roll 10 has an end face 12 joined by an intermediate tapered section 14 to a reduced diameter section 16 surrounded by a sleeve 18. The sleeve is keyed or otherwise secured to the roll neck, and is journalled in a bushing 20 fixed within a roll chock 22. Oil is supplied continuously at the bearing interface between the sleeve and bushing. A seal assembly generally indicated at 24 surrounds the intermediate tapered roll neck section 14. The seal assembly prevents oil from escaping from the bearing and also prevents contaminants such as cooling water, mill scale, etc. from penetrating into the bearing.

The seal assembly includes a circular flexible flanged neck seal 26, a flinger ring 28, a seal end plate 30 and a coolant seal 32. The neck seal 26 and flinger ring 28 are carried on and rotate with the roll neck, whereas the seal end plate 30 and coolant seal 32 remain fixed in relation to the bearing chock 22.

The coolant seal 32 has a radial base flange 34 integrally joined at its inner edge as at 36 to a sealing flange 38 extending angularly therefrom. Flange 38 terminates in a relatively sharp sealing lip 39 sealingly contacting the roll end face 12. The base flange has holes 40 through which protrude screws 42 which are threaded into the seal end plate 30. The base flange 34 has an integral circular shoulder 44 which protrudes axially towards the roll end face 12, and which acts as a bumper against which the roll end face may bear during an extreme axial "floating" of the roll in relation to the chock.

While this arrangement has the capability of operating in a generally satisfactory manner, it does embody several drawbacks. For example, when the roll moves axially towards the seal end plate 30, the sealing lip 39 undergoes a substantial radial expansion from its original diameter $D_1$ to an enlarged diameter $D_2$. This produces a substantial hoop stress at the sealing lip 39 which causes it to bear against the roll end face 12 with increased pressure. This increased pressure generates increased heat and friction and accelerates wear of the sealing lip. Moreover, under extreme conditions, as illustrated for example in FIG. 2, the increased hoop stress can cause the sealing flange to "belly out" as at 44. This further increases friction, heat and wear of the sealing flange. Also, at locations between the screws 42, the increased hoop stress can pull the base flange 34 away from the end of the seal end plate, thereby opening up spaces 46 through which coolant and entrained contaminants can penetrate into the bearing.

SUMMARY OF THE INVENTION

The present invention obviates or at least substantially minimizes the above-mentioned problems by providing the sealing flange with mutually angularly offset first and second portions interconnected by a hinge portion. The configuration, flexibility and resilience of the sealing flange is such that as the sealing lip is pressed towards the seal end plate by the roll end face, the hinge portion undergoes both axial displacement and radial expansion. This allows the sealing lip to follow a substantially axial path with very little accompanying radial expansion. By shifting most of the radial expansion and accompanying increased hoop stress away from the seal-ing lip to the hinge portion, lip pressure on the roll end face is significantly minimized, thus decreasing friction, heat and wear.

Preferably, the sealing lip is provided with a rounded configuration, which further reduces frictional wear.

These and other objects and advantages of the present invention will be better understood as the description proceeds with continued reference to the accompanying drawings, wherein:

DESCRIPTION OF PREFERRED EMBODIMENT

Figure 1:
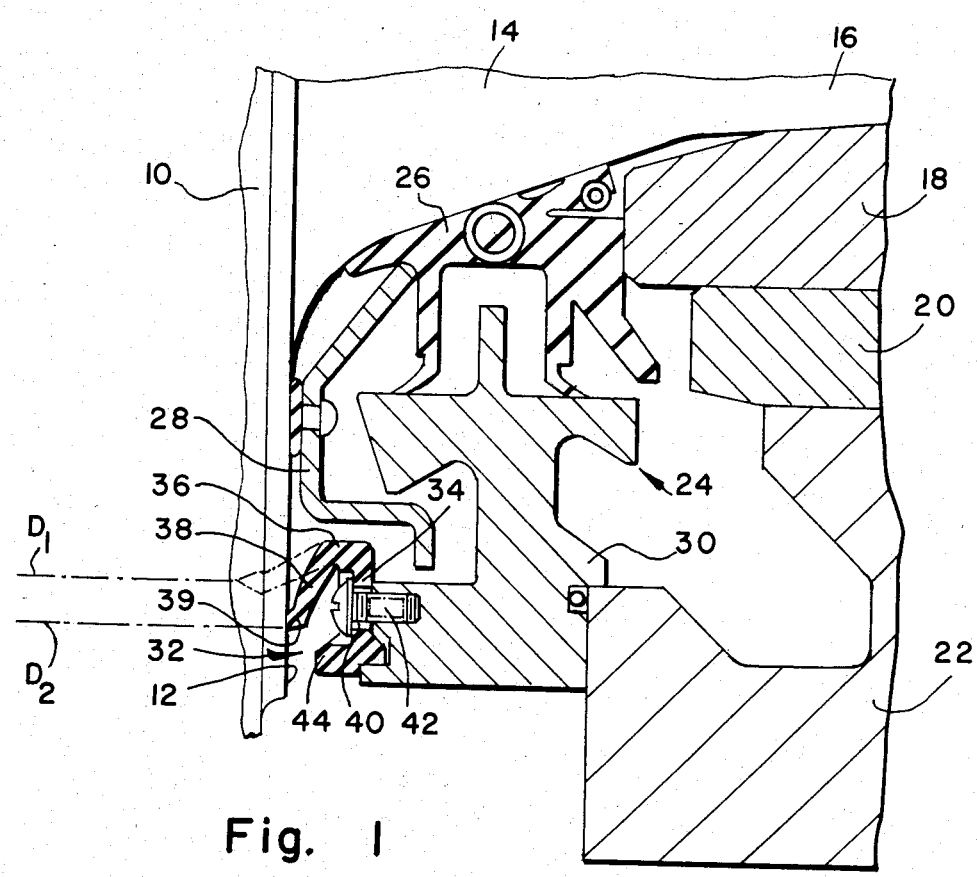
FIG. 1 is a partial view in cross section of a rolling mill oil film bearing assembly incorporating a prior art coolant seal.
Figure 2:
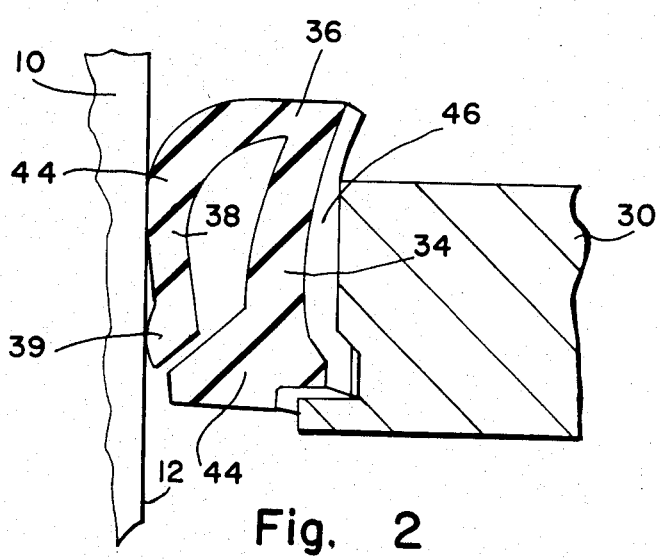
FIG. 2 is an enlarged partial view of the prior art coolant seal of FIG. 1, illustrating the extent of seal deformation occasioned by movement of the roll end face towards the seal end plate.
Figure 3:
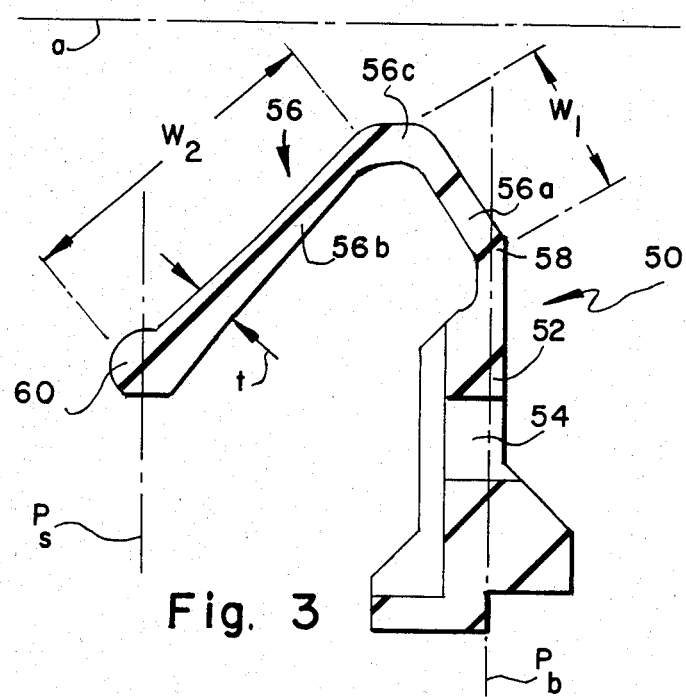
FIG. 3 is a cross sectional view of an improved coolant seal in accordance with the present invention.

A preferred embodiment of the invention will now be described with additional reference to FIGS. 3 and 4, where the components of the bearing assembly which are common to those illustrated in FIGS. 1 and 2 are identified by the same reference numerals.

The coolant seal 50 includes a radially extending circular base flange 52 lying in a base plane $P_b$. The base flange has holes 54 which accommodate mounting screws 42 used to secure the seal to the seal end plate 30. A flexible circular sealing flange generally indicated at 56 is integrally joined at one edge as at 58 to the base flange. The sealing flange extends resiliently from the base flange to terminate at its opposite edge in a rounded lip 60. The lip 60 is located in a sealing plane $P_s$ spaced axially from and parallel to the base plane $P_b$, and is thus positioned to sealingly contact the roll end face 12.

The sealing flange 56 includes mutually angularly offset first and second portions 56a, 56b interconnected by an intermediate hinge portion 56c. The first portion 56a extends angularly away from the base plane $P_b$ and inwardly towards the seal axis "a" where it terminates at the intermediate hinge portion 56c, and the second portion 56b extends from the hinge portion angularly outwardly away from the seal axis and towards the sealing plane $P_s$.

Preferably, the width $w_1$ of the first portion 56a is less than the width $w_2$ of the second portion 56b. Also, the thickness "t" of the second portion preferably decreases from a maximum dimension adjacent to the sealing lip 60 to a minimum dimension adjacent to the hinge portion 56c. This provides the second portion 56b with greater stiffness in the vicinity of the lip as compared to the stiffness of the remainder of the second portion and the stiffness of the first portion 56a.

The coolant seal 50 is molded of rubber or other like elastomeric material. Preferably, the hardness durometer of the base flange 52 is greater than that of the sealing flange 56.

Figure 4:
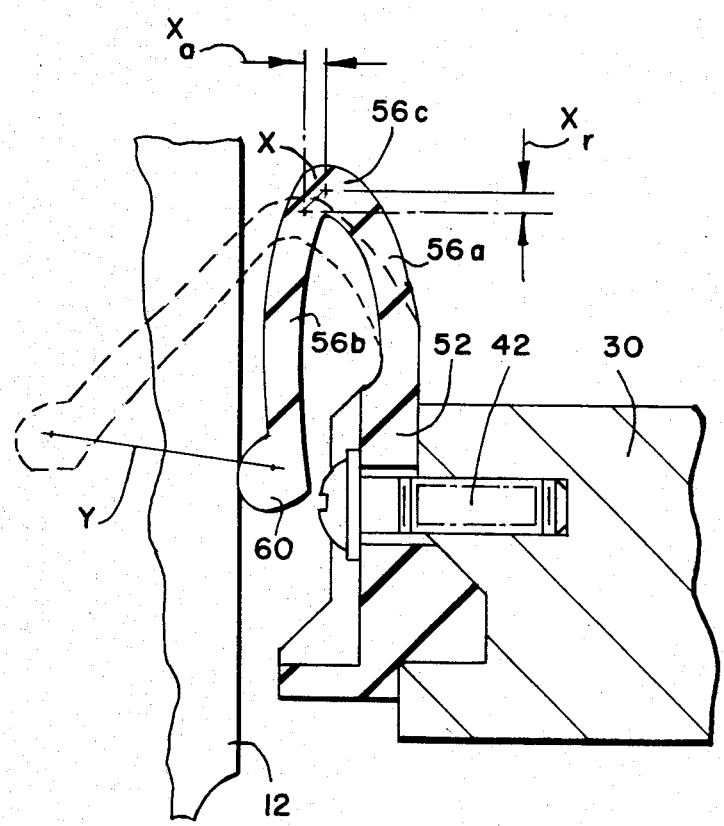
FIG. 4 is an illustration showing how the coolant seal of the present invention reacts to deformation by the roll end face.

As shown in FIG. 4, when the coolant seal 50 undergoes deformation as a result of the sealing lip 60 being pressed toward the base flange 52 by the roll end face 12, the configuration, flexibility and resilience of the sealing flange 56 is such that its hinge portion 56c follows an angular path X. The path X has a radial component $X_r$ and an axial component $X_a$. This combined radial and axial displacement of the hinge 56c allows the sealing lip 60 to follow a predominantly axial path Y, with very little accompanying radial expansion. Thus, the hoop stress which normally accompanies radial expansion of a resilient circular body is transferred to a large extent from the sealing lip 60 to the hinge portion 56c. The net result is that the sealing lip contacts the roll end face 12 with a relatively light pressure as compared with the prior art coolant seal illustrated in FIGS. 1 and 2. This light contact pressure generates only moderate friction and heat, thereby significantly lengthening the useful life of the seal. The increased thickness "t" of the second portion 56b in the vicinity of the lip 60 is also advantageous in that it provides a larger heat sink to transfer heat generated by contact friction away from the lip.

A further advantage of the present invention is that the configuration, flexibility and resilience of the sealing flange is such that it can accommodate axial floating of the roll without distorting the base flange 52 and its sealing engagement with the seal end plate 30. In other words, the base flange 52 is effectively isolated from the bending moments being applied to the sealing flange 56.

The rounded configuration of the sealing lip 60 is also advantageous in that it promotes line contact between the lip and roll end face. Any resulting wear is thus minimized and more uniform.

We claim:

1. In an oil film bearing assembly of the type adapted both to rotatably support and to accommodate limited axial movement of a roll neck in a rolling mill, the bearing assembly having a circular stationary component which surrounds the roll neck at a location spaced axially from an end face of the roll, a circular seal for preventing contaminants such as liquid coolant, mill scale, etc. from entering the bearing assembly between the roll end face and the stationary component, said seal comprising: a radially extending base flange adapted to be fixed to the stationary component; and, a flexible sealing flange integrally joined at one edge to and extending resiliently from said base flange, said sealing flange terminating at the opposite edge in a lip spaced axially from said base flange at a position to sealingly contact the roll end face, said sealing flange having mutually angularly offset first and second portions interconnected by an intermediate hinge portion, the configuration, flexibility and resilience of said sealing flange being such that axial displacement of said lip in relation to said base flange by said roll end face is accompanied by axial and radial displacement of said hinge portion.

2. A circular seal comprising: a base flange arranged in a base plane perpendicular to the seal axis; a flexible resilient sealing flange integrally joined at one edge to said base flange and terminating at the opposite edge in a sealing lip located in a sealing plane parallel to and spaced axially from said base plane, said sealing lip having a first portion extending from said base flange angularly away from said base plane and inwardly towards the seal axis to an intermediate hinge portion, and a second portion extending from said hinge portion away from the seal axis and angularly towards said sealing plane.

3. The seal of claim 2 wherein the configuration, flexibility and resilience of said sealing flange is such that axial displacement of said lip in relation to said base flange is accompanied by both axial and radial displacement of said hinge portion.

4. The seal of claim 1 wherein said first portion extends angularly inwardly from said base flange towards the seal axis to said hinge portion, and wherein said second portion extends angularly outwardly from said hinge portion away from the seal axis to said lip.

5. The seal of either claims 1, 2 or 3 wherein the width of said first portion is less than the width of said second portion.

6. The seal of either claims 1, 2 or 3 wherein the thickness of said second portion decreases from said lip to said hinge portion.

7. The seal of either claims 1, 2 or 3 wherein said lip has a rounded end configuration.

8. The seal of either claims 1, 2 or 3 wherein said second portion has greater stiffness in the vicinity of said lip as compared to the stiffness of the remainder of said second portion adjacent said hinge portion and the stiffness of said first portion.

* * * * *